US00RE43044E

(19) United States
(12) Reissued Patent
Zaleski et al.

(10) Patent Number: US RE43,044 E
(45) Date of Reissued Patent: Dec. 27, 2011

(54) ELECTRICALLY CONDUCTIVE PAVEMENT MIXTURE

(75) Inventors: Peter L. Zaleski, Redmond, WA (US); David J. Derwin, Prospect Heights, IL (US); Walter H. Flood, Chicago, IL (US)

(73) Assignee: Superior Graphite Co., Chicago, IL (US)

(21) Appl. No.: 11/999,477

(22) PCT Filed: Nov. 16, 2001

(86) PCT No.: PCT/US01/43705

§ 371 (c)(1), (2), (4) Date: Nov. 3, 2003

(87) PCT Pub. No.: WO02/40807

PCT Pub. Date: May 23, 2002

Related U.S. Patent Documents

Reissue of:
(64) Patent No.: 6,971,819
Issued: Dec. 6, 2005
Appl. No.: 10/416,670
Filed: Nov. 3, 2003

U.S. Applications:
(60) Provisional application No. 60/249,241, filed on Nov. 16, 2000.

(51) Int. Cl.
*E01C 7/00* (2006.01)

(52) U.S. Cl. ..... 404/31; 404/17; 404/71

(58) Field of Classification Search ..... 404/17, 404/27, 31, 71
See application file for complete search history.

(56) References Cited

U.S. PATENT DOCUMENTS

| | | | | |
|---|---|---|---|---|
| 3,047,701 | A * | 7/1962 | Frungel | 219/213 |
| 3,166,518 | A * | 1/1965 | Barnard | 252/503 |
| 3,573,427 | A * | 4/1971 | Minsk | 219/213 |
| 3,626,149 | A * | 12/1971 | Carney et al. | 219/213 |
| 4,319,854 | A * | 3/1982 | Marzocchi | 404/28 |
| 4,564,745 | A * | 1/1986 | Deschenes | 219/213 |
| 4,571,860 | A * | 2/1986 | Long | 37/197 |
| 5,707,171 | A * | 1/1998 | Zaleski et al. | 404/28 |
| 6,461,424 | B1 * | 10/2002 | Ramme et al. | 106/709 |
| 6,503,318 | B2 | 1/2003 | Pye et al. | |
| 6,511,258 | B1 * | 1/2003 | Johnsen | 404/75 |
| 6,749,678 | B1 * | 6/2004 | Reynhout | 106/281.1 |
| 6,971,819 | B2 * | 12/2005 | Zaleski et al. | 404/31 |

FOREIGN PATENT DOCUMENTS

JP 6-231868 8/1994

* cited by examiner

*Primary Examiner* — Gary S Hartmann
(74) *Attorney, Agent, or Firm* — Cook Alex Ltd.

(57) ABSTRACT

An electrically conductive paving system that has enhanced conductivity of the conductive graphite/asphalt layer. This is achieved by incorporating into the paving mixture a blend of two naturally occurring crystalline flake graphites, one being coarse (generally larger than 40 mesh/425 microns) and the other being fine (generally smaller than 100-200 mesh/150-75 microns). The ratio of course flake graphite to fine flake graphite may be from 1.5:1 and 1:1.5, but is preferably approximately 1:1.

5 Claims, 1 Drawing Sheet

ELECTRICALLY CONDUCTIVE PAVEMENT MIXTURE

Matter enclosed in heavy brackets [ ] appears in the original patent but forms no part of this reissue specification; matter printed in italics indicates the additions made by reissue.

This application claims the benefit of Provisional Application No. 60/249,241 filed Nov. 16, 2000.

BACKGROUND OF THE INVENTION

It is known to use electrically conductive paving mixtures as part of a pavement system to prevent the accumulation of frozen precipitation by use of electrically-generated heat.

In our prior U.S. Pat. No. 5,707,171, an electrically conductive paving system is disclosed that comprises a grid of electrically conductive cables, a layer of electrically conductive paving mixture, an electrical power supply, and a monitoring system. The paving mixture comprises an aggregate fraction, a bituminous fraction, and a fraction of blended graphite particles, the graphite particles including a naturally-occurring portion and a synthetically-produced portion in a ratio of 2:1.

The paving mixture of the prior patent was designed to have sufficient stability and strength for use on airport runways. This required compromising the conductivity characteristics of the paving mixture in order to achieve sufficient stability and strength. If the electrically conductive paving is to be used in a less demanding environment, such as pedestrian walkways or lightly-traveled roadways, the stability/strength requirements of the pavement becomes less constraining.

DETAILED DESCRIPTION

Figure 1:
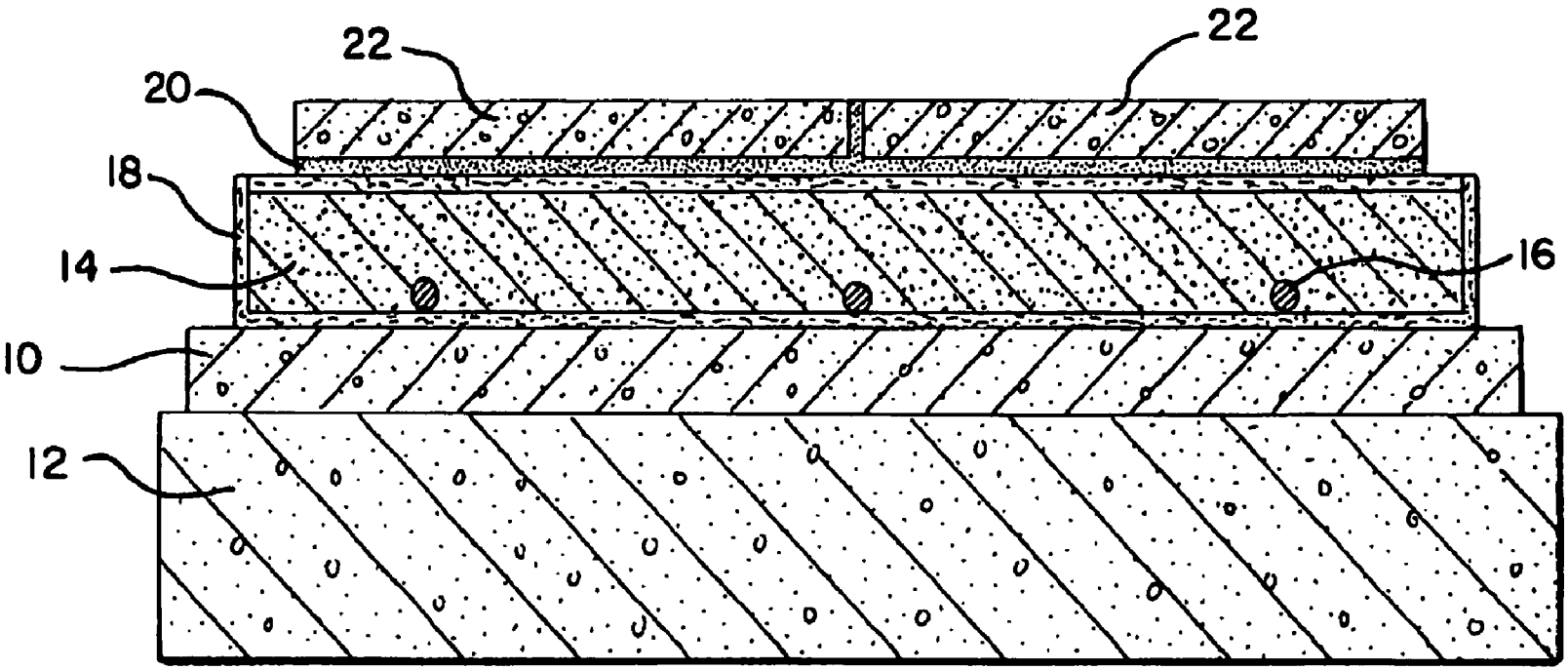
FIG. 1 is a cross sectional view of an electrically conductive pavement system according to the present invention.

In the present invention, the paving system has been improved to enhance conductivity of the conductive graphite/asphalt layer. This is achieved by replacing the blend of two graphites, one naturally occurring and the other synthetically produced, with a blend of two naturally occurring crystalline flake graphites, one being coarse (generally larger than 40 mesh/425 microns) and the other being fine (generally smaller than 100-200 mesh/150-75 microns). The ratio of course flake graphite to fine flake graphite may be from 1.5:1 to 1:1.5, but is preferably approximately 1:1. The increased conductivity of the graphite/asphalt layer enables the user to optimize the efficiency in the design of the electrically conductive paving system for increased heat transfer.

In one embodiment of this invention, the relative proportion of the coarser sized natural crystalline flake graphite (commercially available from the Superior Graphite Co. of Chicago, Ill., USA as grade 3298) and the finer sized natural crystalline flake graphite (Superior Graphite Co. grade −190) is 1:1. The mixture was designed in accordance with Asphalt Institute MS-2 "Mix Design Methods for Asphalt Concrete and other Hot Mix Types." When added to the bituminous fraction, the blended graphite particles comprise approximately 10-25 percent, by weight, of the electrically conductive paving mixture.

The size characteristics of the two natural crystalline flake graphites used in the above-described embodiment are as follows: The coarser sized natural crystalline flake graphite (Superior Graphite grade 3298) has a gradation of not less than 95% passing a U.S. Standard 20 mesh (850 micron) sieve and a minimum of at least 80% being retained on a U.S. Standard 35 mesh (500 micron) sieve. The finer sized natural crystalline flake graphite (Superior Graphite grade −190) has a gradation of at least 80% minimum passing a U.S. Standard 100 mesh (150 micron) sieve.

The resistivity measurements, based on previous experience, indicate that the amount of graphite can be reduced to at least 15 percent of the aggregate and still achieve excellent resistivity with stability suitable for pedestrian applications and normal void content. The optimum bitumen content was found to be 7.2 percent of the aggregate, based on this new graphite blend. Graphites and mixes will change depending on the anticipated use for the system, as well as the aggregate used at each installation site.

The application and operation of a pavement system utilizing the above-described paving mixture is generally in accordance with the technique set forth in our prior U.S. Pat. No. 5,707,171, which is incorporated herein by reference. With reference to FIG. 1, a schematic view of an electrically-conducted pavement system adapted for using the present invention is shown. A base pavement 10, generally on the order of 50 mm thick, is layed over a base layer 12. On top of the base pavement 10 the conductive layer 14 is layed. The conductive layer 14 is also on the order of 50 mm thick and includes a grid of electrically-conductive cables 16, preferably made of copper.

In the illustrated installation, a waterproof membrane 18 of an asphalt-impregnated fabric substantially surrounds the conductive layer. This layer, preferably comprised of a non-woven fabric commonly used in roadway construction, provides additional insulative protection, increased durability, and improved resistance to water seepage.

A layer of sand 20 is placed over the conductive layer and concrete pavers 22 are placed on top thereof to complete the pavement system.

Accordingly, an electrically conductive paving mixture and system have been provided that meet all the objectives of the invention. While the invention has been described in terms of certain preferred embodiments, there is no intent to limit the invention to the same. Instead, the invention is defined by the following claims.

What is claimed is:

1. An electrically conductive paving mixture comprising:

an aggregate fraction;

a bituminous fraction; and a fraction of blended natural flake graphite, the blended natural flake graphite comprising a coarse portion [of] *which is* greater than 425 microns in size and a fine portion [of] *which is* less than [200] *150* microns in size, the coarse portion and the fine portion being combined in a ratio of between 1.5:1 and 1:1.5 and comprising 10-25 percent by weight of the paving mixture.

2. The electrically conductive paving mixture of claim 1 wherein at least 95 percent of the coarse portion is smaller than 850 microns and at least 80 percent of the coarse portion is larger than 500 microns[, while at least 80 percent of the fine portion is smaller than 150 microns].

3. An electrically conductive pavement system comprising:

a grid of electrically conductive cables, an electrically conductive paving mixture covering and surrounding the grid; the paving mixture having an aggregate fraction, a bituminous fraction, and a fraction of natural flake graphite comprising a coarse portion [of] *which is* greater than 425 microns in size and a fine portion [of] *which is* less than [200] *150* microns in [seizes] *size*, the coarse portion and the fine portion being combined in a ratio of between 1.5:1 and 1:1.5 and comprising 10-25 percent by weight of the paving mixture; and an asphalt-impregnated fabric encapsulating the conductive pavement.

4. The electrically conductive pavement system of claim 3 wherein the coarse portion and the fine portion of the graphite fraction are combined in a 1:1 ratio.

5. The electrically conductive pavement system of claim 3 wherein at least 95 percent of the coarse portion is smaller than 850 microns and at least 80 percent of the coarse portion is larger than 500 microns[, while at least 80 percent of the fine portion is smaller than 150 microns].

* * * * *